United States Patent [19]

Kurakake

[11] Patent Number: 4,751,442

[45] Date of Patent: Jun. 14, 1988

[54] SERVOMOTOR DRIVE CONTROL SYSTEM

[75] Inventor: Mitsuo Kurakake, Hino, Japan

[73] Assignee: Fanuc Ltd, Minamitsuru, Japan

[21] Appl. No.: 893,305

[22] PCT Filed: Dec. 26, 1985

[86] PCT No.: PCT/JP85/00722

§ 371 Date: Jul. 31, 1986

§ 102(e) Date: Jul. 31, 1986

[87] PCT Pub. No.: WO86/04193

PCT Pub. Date: Jul. 17, 1986

[30] Foreign Application Priority Data

Dec. 27, 1984 [JP] Japan ............................. 59-281185

[51] Int. Cl.$^4$ ............................................ G05B 19/00
[52] U.S. Cl. .................................... 318/567; 318/599;
318/603; 318/811; 318/606; 364/131
[58] Field of Search ................ 364/131, 132; 318/618,
318/599, 606, 607, 603, 567, 807, 811, 245

[56] References Cited

U.S. PATENT DOCUMENTS

| 4,288,849 | 9/1981 | Yoshida et al. | 318/562 X |
| 4,473,786 | 9/1984 | Myashita et al. | 318/618 X |
| 4,478,629 | 10/1984 | Wood et al. | 364/473 X |
| 4,511,982 | 4/1985 | Kurakake | 364/131 X |
| 4,574,227 | 3/1986 | Herder et al. | 318/616 X |
| 4,580,207 | 4/1986 | Arai | 364/131 X |
| 4,641,269 | 2/1987 | Japenga et al. | 364/131 X |

Primary Examiner—Benjamin Dobeck
Attorney, Agent, or Firm—Staas & Halsey

[57] ABSTRACT

A servomotor drive control system in which current control of a servomotor is performed by a microprocessor on the basis of a current feedback signal of the servomotor an interrupt generating circuit interrupts the microprocessor a circuit for storing an interrupt period and a current command applied to the servomotor are also included in the system. The arrangement is such that an interrupt period is set in dependence upon the rating of the servomotor being driven and controlled.

10 Claims, 2 Drawing Sheets

SERVOMOTOR DRIVE CONTROL SYSTEM

BACKGROUND OF THE INVENTION

This invention relates to a servomotor drive control system in which a microprocessor is utilized as a servo-control unit.

In order to control a multiple-axis machine tool or the like with a high degree of accuracy, use is made of a servomotor driven by a command signal from a numerical control unit (hereafter referred to as an NC unit) or the like. Conventionally, servomotors of this type are driven by analog servo systems. However, with the progress that has recently been made in the technical development of computer control, various expedients dealing with the question of how to control a plurality of servomotors efficiently by a single control unit have been devised.

A microprocessor generally has its operation decided by a control program. By creating a control program to conform to the control configuration, therefore, various types of servo control can be realized by one and the same servo-control unit, as is well known.

FIG. 2 is a block diagram illustrating the general features of a servomotor control circuit of this type. As shown in the Figure, a main CPU 1 of microprocessor construction, which is for reading in input data and executing predetermined processing, and a plurality of shared RAMs 2, are connected to an NC unit side by a data bus B1. A servo-control CPU 3 of microprocessor construction is connected to each of the shared RAMs 2 via a bus B2 and outputs an analog signal indicative of a velocity command to each servoamplifier 4 associated with a servomotor. The servoamplifier 4 comprises a velocity control circuit 5, a current control circuit 6 and an inverter 7 and subjects a servomotor 8 to prescribed feedback control on the basis of current, position and velocity.

Each shared RAM 2 is for an exchange of data between the main CPU 1 and the servo-control CPU 3. For example, a signal indicative of the position of the servomotor 8 is temporarily stored in the shared RAM 2 through the servo-control CPU 3, and the main CPU 1 reads out this stored value to perform display processing and the like. Further, a position command signal from the main CPU 1 is temporarily stored in the shared RAM 2 and the servo-control CPU 3 reads out this stored value and outputs a velocity command to the servoamplifier 8.

In a servomotor drive control system thus constructed, it can be arranged so that the same hardware will suffice regardless of whether the servomotor is of the AC or DC type if a so-called "soft" servo system is adopted in which all control functions, except for that of the inverter in the servoamplifier, are replaced by a microprocessor and the amplifier function is provided on the side of the NC unit. This is so because the only difference between AC and DC motor control is that the PWM signals applied to the driven inverter either will be required in three phases, thus requiring that six signals be used, or in one phase, in which case only two signals will suffice. However, in a case where an AC synchronous servomotor is to be subjected to current control by a microprocessor, the frequency characteristic of the current loop must be made faster by about one digit place than the frequency characteristics of the position and velocity loops, as shown in FIG. 3(a). Consequently, even though processing for position control and velocity control is performed at a period of e.g., 1 ms, processing for current control must be executed at a period of 166 μs, which is 1/6 of the above. Moreover, since response cannot be neglected, the periods of position control and velocity control cannot be lengthened in order to raise torque efficiency.

If the servomotor motor is of the DC type, on the other hand, the frequency characteristic of the current loop should be slowed down. For example, if the period is made 333 μs, as shown in FIG. 3(b), a plurality of servomotors can be controlled by a single servo CPU even if control is exercised by a processor having the same processing speed. Nevertheless, the processor cannot be made to demonstrate its processing capability with the same type of hardware arrangement.

SUMMARY OF THE INVENTION

Accordingly, an object of the present invention is to provide a servomotor drive control system in which current control of a servomotor is performed by a microprocessor on the basis of a servomotor current feedback signal, wherein both AC and DC servomotors can be controlled by the same hardware arrangement and no decline is caused in the processing capability of the microprocessor.

The present invention provides a servomotor drive control system in which current control of a servomotor is performed by a microprocessor on the basis of a servomotor current feedback signal. The servomotor drive control system is characterized by having a main CPU for performing input data and sequence data processing of the servomotor, a servo-control CPU coupled to the main CPU for controlling current, velocity and position of the servomotor, interrupt generating means connected to this CPU for generating an interrupt command at an interrupt period set in dependence upon a rating of the servomotor, and means for storing the interrupt command and a current command applied to the servomotor.

The servomotor drive control system according to the present invention provides a drive control signal corresponding to drive torque by setting a current loop interrupt period conforming to the rating of the servomotor to be controlled in the microprocessor that effects the current control of the servomotor. This enables various servomotors to be controlled in a highly efficient manner.

DESCRIPTION OF THE PREFERRED EMBODIMENT

An embodiment of the present invention will now be described in detail with reference to the drawings.

Figure 1:
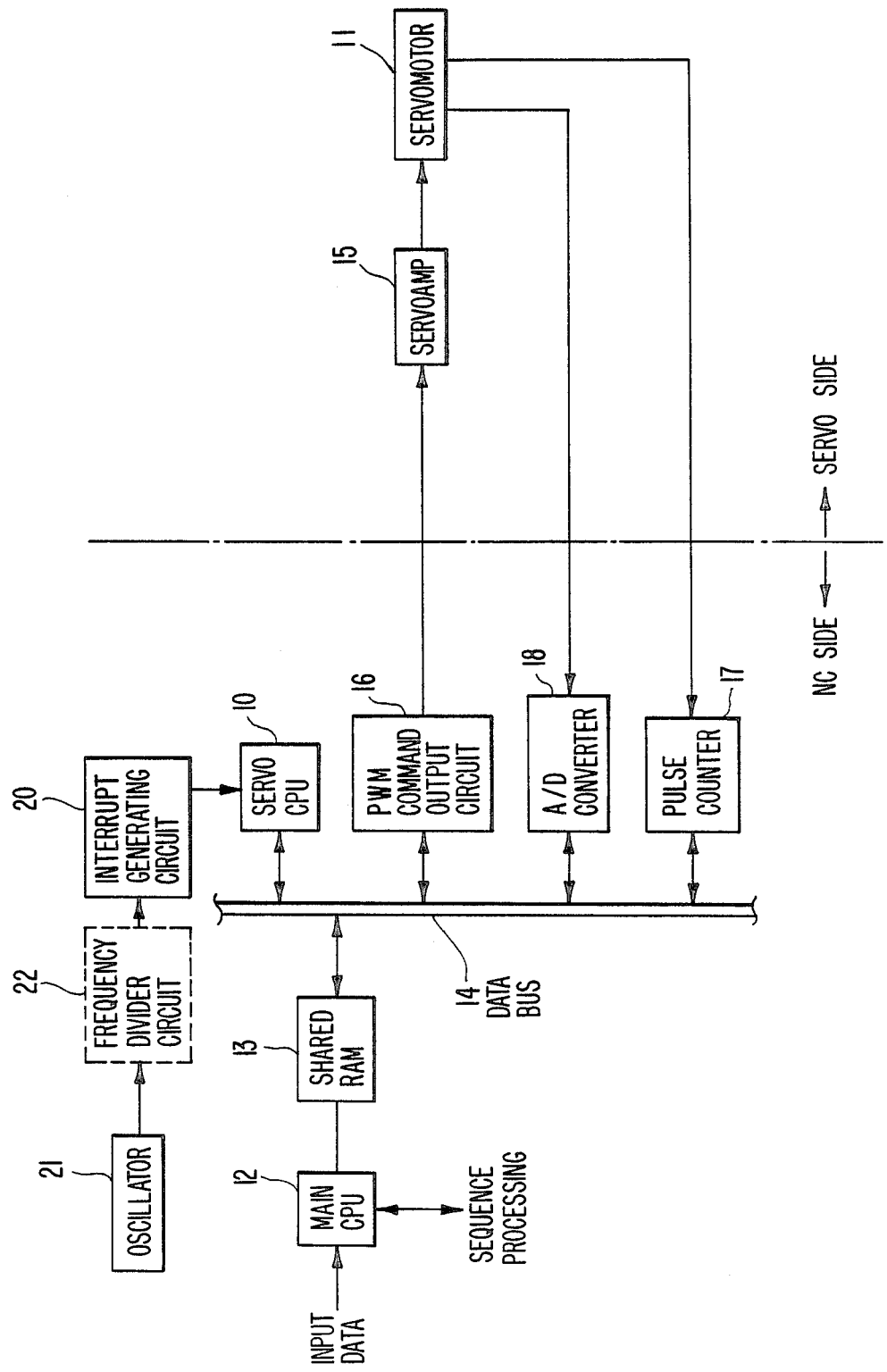
FIG. 1 is a block diagram of an embodiment according to the present invention.
Figure 2:
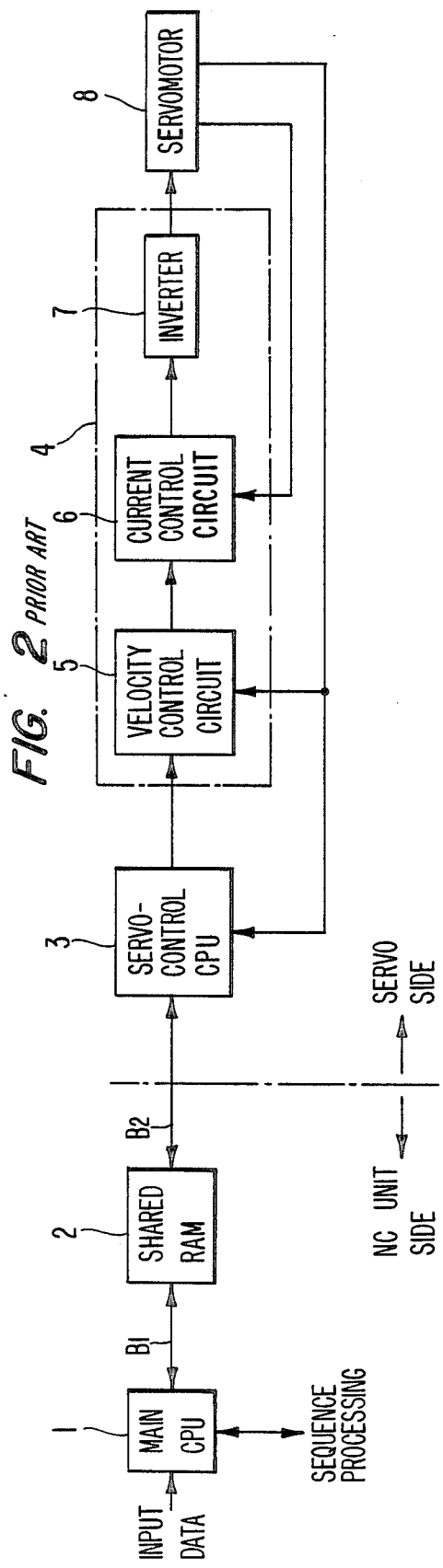
FIG. 2 is a block diagram of a conventional servomotor control system.
Figure 3:
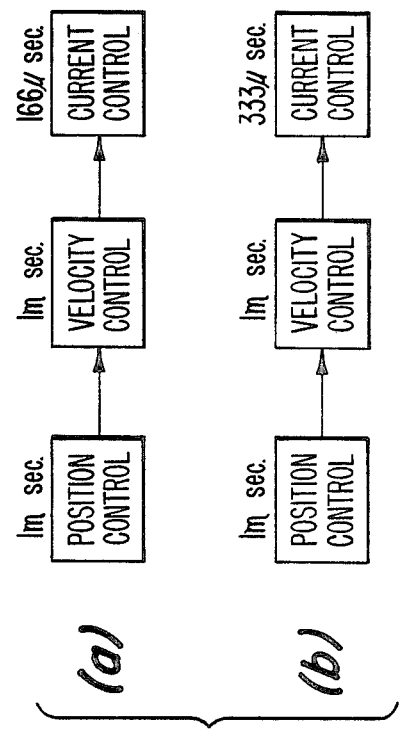
FIGS. 3(a), (b) are diagrams of AC and DC servo-control timings, respectively.

In FIG. 1, numeral 10 denotes a servo CPU of microcomputer construction for controlling a servomotor 11. The CPU 10, which controls the current, velocity and position of the servomotor 11, is arranged in an NC unit along with a main CPU 12, which executes a series of sequence processing steps in accordance with input data, and a shared RAM 13 for delivering data. The CPU 10 is coupled to the main CPU 12 by a data bus 14 via the shared RAM 13. The servo-control CPU 10 provides a servo-amplifier 15 with a PWM command, in the form of a digital signal, from a PWM command output circuit 16. The servo-amplifier 15 is constructed to include only final stage driver elements such as power transistors forming an inverter. In other words, the servo-amplifier includes three-phase elements if the servomotor is an AC synchronous motor and single phase elements if the servomotor is a DC motor.

Numeral 17 denotes a counter for counting detection pulses from a sensor such as a rotary encoder, and numeral 18 designates an A/D converter. These convert a current feedback signal into a digital signal, which is applied to the CPU 10. A data memory (RAM), program memory, data table and the like are also connected to the data bus 14 if necessary. Numeral 20 designates an interrupt generating circuit connected to the servo CPU 10. An oscillator 21 for producing a reference frequency is connected to the interrupt generating circuit 20. The arrangement is such that a current loop interrupt period is set conforming to the rating of the servomotor 11 controlled by the servo CPU 10. It is arranged so that a desired interrupt period is obtained, either by constructing the oscillator 21 to vary its own oscillation frequency or by such an expedient as connecting a frequency divider 22 thereto to vary the oscillation frequency of the oscillator 21.

By thus making it possible to vary the interrupt period of the CPU 10 on the servo-controller side, the NC side is capable of efficiently controlling AC and DC servomotors with the same hardware configuration. More specifically, if the frequency characteristic of current control performed by the servo CPU 10 is set to 166 μsec in case of an AC motor and to 333 μsec by changing over the frequency divider circuit 22 in case of a DC motor, current control of three DC servomotors by means of a single servo CPU becomes possible.

Accordingly, in a case where the servo CPU 10 is provided within the NC unit together with the main CPU 12 and a plurality of DC servomotors are driven and controlled by transferring data between the two CPUs at high speed via the shared RAM 13, an interrupt period can be set in dependence upon the ratings of the servomotors. Furthermore, the frequency characteristic of the current loop can be set accurately for raising the torque efficiency of an AC motor and a drive control signal corresponding to the drive can be supplied. A variety of servomotors can be driven and controlled efficiently by interconnecting the main CPU and servo CPUs provided specially for respective servomotors.

The servomotor drive control system according to the present invention is adapted to generate the microprocessor interrupt period in addition, a current command is applied to the servomotor at an interrupt period set in dependence upon the rating of the servomotor. Accordingly AC and DC servomotors can both be controlled with the same hardware configuration and there is no decline caused in the processing capability of the microprocessor.

I claim:

1. A servomotor drive control system, comprising:
    a servomotor;
    a main CPU, coupled to said servomotor, for performing input data and sequence data processing of said servomotor;
    a servo-control CPU, coupled to said main CPU, for controlling current, velocity and position of said servomotor;
    interrupt generating means, connected to said servo-control CPU, for generating an interrupt command at an interrupt period set in dependence upon a rating of said servomotor; and
    means, connected to said interrupt generating means, for storing said interrupt command and a current command applied to said servomotor.

2. A servomotor drive control system according to claim 1, wherein said interrupt generating means comprises:
    an interrupt generator coupled to said servo-control CPU; and
    an oscillator, coupled to said interrupt generator for determining the interrupt period.

3. A servomotor drive control system according to claim 2, wherein said interrupt generating means further comprises a frequency divider means coupled between said oscillator and said interrupt generator.

4. A servomotor drive control system including a servomotor comprising:
    a main CPU, coupled to the servomotor, for performing a programmed numerical control operation including controlling the servomotor, and receiving input data to operate the servomotor, processing the received input date for performing numerical data control, and issuing an operating command to the servomotor;
    a servo-control CPU, connected to said main CPU and said servomotor, for receiving the operating command from said main CPU and for controlling a current supplied to the servomotor, rotational speed and position of the servomotor in accordance with the operating command;
    a shared random access memory (RAM), connected between said main CPU and said servo-control CPU, for temporarily storing data transmitted between said main CPU and said servo-control CPU;
    a servo-amplifier, connected between said shared RAM and the servomotor, for driving the servomotor;
    a pulse width modulated (PWM) command output circuit connected between said servo-control CPU and said servo-amplifier, for applying a pulse width modulated signal to said servo-amplifier in response to a command from said servo-control CPU;
    interrupt generating means, connected to said servo-control CPU, for generating an interrupt command and an interrupt period set in dependence upon a rating of the servomotor; and
    an oscillator, connected to said interrupt generator means, for generating an interrupt command period signal to said servo-control CPU, said interrupt command period signal having a variable period.

5. A servomotor drive control system according to claim 4, wherein the servomotor comprises an induction motor.

6. A servomotor drive control system according to claim 4, wherein the servomotor comprises a synchronous motor.

7. A servomotor drive control system according to claim 4, wherein the servomotor comprises a DC motor.

8. A servomotor drive control system according to claim 5, wherein said oscillator freely establishes a frequency which matches said induction motor.

9. A servomotor drive control system according to claim 6, wherein said oscillator freely establishes a frequency which matches said synchronous motor.

10. A servomotor drive control system according to claim 7, wherein said oscillator freely establishes a frequency which matches said DC motor.

* * * * *

UNITED STATES PATENT AND TRADEMARK OFFICE
CERTIFICATE OF CORRECTION

PATENT NO. : 4,751,442

DATED : JUNE 14, 1988

INVENTOR(S) : MITSUO KURAKAKE

It is certified that error appears in the above-identified patent and that said Letters Patent is hereby corrected as shown below:

FRONT PAGE [57] ABSTRACT, line 5, "an" should be --. An--;

line 6, after "microprocessor" insert --and--.

Col. 2, line 1, after "of" insert --,--.

Col. 3, line 52, "in" should be --. In--.

*Col. 4, line 23, "date" should be --data--.

Signed and Sealed this

Twenty-seventh Day of September, 1988

Attest:

DONALD J. QUIGG

*Attesting Officer*      *Commissioner of Patents and Trademarks*